May 2, 1961   R. W. WELLER   2,982,944
VEHICLE SIGNALING DEVICE
Filed April 13, 1959
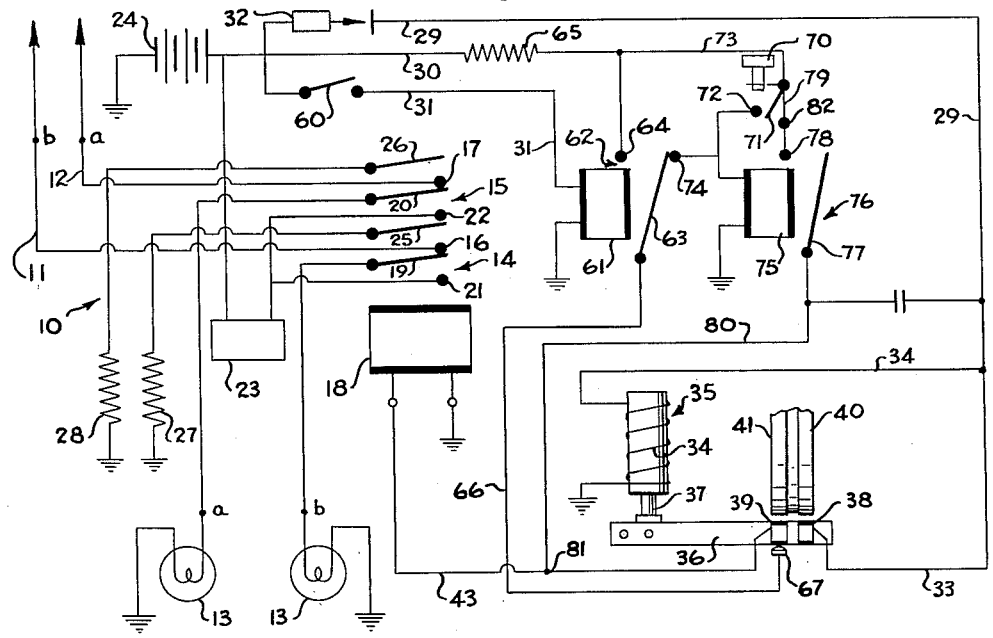
Fig. 1
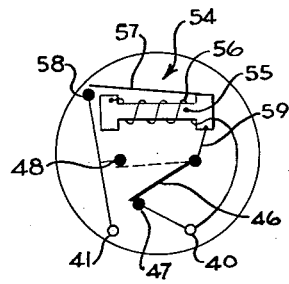
Fig. 4
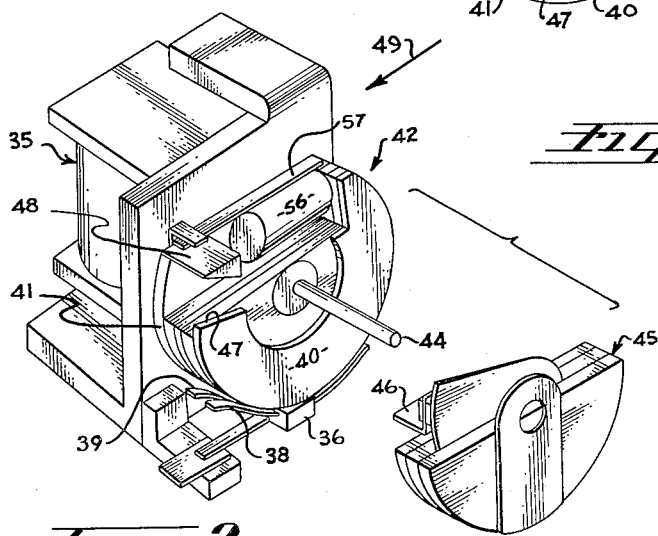
Fig. 2
Fig. 3
*INVENTOR.*
ROBERT W. WELLER
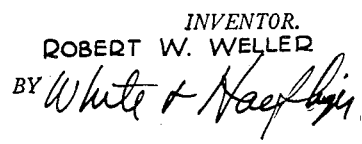
ATTORNEYS United States Patent Office 2,982,944
Patented May 2, 1961

2,982,944

VEHICLE SIGNALING DEVICE

Robert W. Weller, 26017 Eshelman Ave., Lomita, Calif.

Filed Apr. 13, 1959, Ser. No. 806,027

14 Claims. (Cl. 340—52)

This invention relates generally to devices for flashing warning lights on vehicles, and more specifically has to do with improvements in such devices capable of effecting flashing of a warning light or lights at the rear of the vehicle as during deceleration of the vehicle and also at the will of the operator while the vehicle is stopped or is backing up.

It is a major object of the invention to provide apparatus of the above character and description which, being operable to flash the warning light during deceleration of the vehicle, is also insensitive to inclination of the vehicle from the horizontal, as for example during the time that the vehicle is climbing a hill. To illustrate, the device being sensitive to deceleration of the vehicle tends to be sensitive to inclination of the vehicle from the horizontal, and this presents the problem of preventing inadvertent flashing of the warning light during times when the vehicle is not decelerating but is running down a hill.

Accordingly, the above object is served through the provision of apparatus broadly comprising reference means supported for movement relative to the vehicle for maintaining a substantially constant level relative to the direction of vehicle travel and during tilting of the vehicle from horizontal and in said direction, together with the other means movable relative to the reference means in response to deceleration of the vehicle. Finally, the apparatus includes an electrical circuit including a switch operable in response to movement of said other means relative to the reference means to effect flashing of the warning light. More particularly, the reference and said other means comprise pendulums, one of which is movable relative to the reference pendulum in response to deceleration of the vehicle, the circuit including an interrupter connectible with the warning light and a switch operable in response to relative movement of the pendulums to effect energization of the interrupter.

Other objects of the invention include the arrangement of the pendulums to rotate together about a common axis as a result of counterbalancing of the pendulums, preventing flashing of the warning light during times that the vehicle is not decelerating but is running down an incline. In addition, the counterbalanced pendulums are stabilized and provide positive switching irrespective of vehicle movement which might otherwise cause inadvertent switching. Also, the invention includes certain circuit components which are operable as will be described to distinct advantage in relation to continued or discontinued flashing of the warning light. For example, parallel circuits are provided for effecting flashing of the light at the will of the operator when the vehicle is not in motion, and also when the vehicle is backing up.

These and other objects and advantages of the invention, as well as the details of an illustrative embodiment, will be more fully understood from the following detailed description of the drawings, in which:

Fig. 1 is a circuit diagram illustrating in detail the elements of the invention;

Fig. 2 is a perspective view of the pendulums referred to;

Fig. 3 is an elevation showing the pendulums as they appear from the front; and

Fig. 4 is an illustrative showing of the electrical parts carried by the two pendulums shown in Figs. 2 and 3.

Referring first to Fig. 1 the circuit generally indicated at 10 is adapted to put together on a small chassis so as to be conveniently connectible into the trunk compartment of a vehicle, not shown. Leads 11 and 12 may then be spliced into the vehicle wiring leading from the front of the car to the filaments of the vehicle stop lights shown at 13, these normally being red lights positioned at opposite sides of the vehicle at the rear thereof. Under normal conditions when the vehicle is not decelerating the leads 11 and 12 are connected with the stop light filaments through a switching device such as the relays 14 and 15 via relay contacts 16 and 17. On the other hand, when it is desired to cause the stop lights to flash interruptedly, the coil 18 common to the relays 14 and 15 is energized to draw the relay arms 19 and 20 away from contacts 16 and 17 and against contacts 21 and 22. At this time, the filaments of the stop lights 13 are then in series with a flasher unit generally indicated at 23, and of commonly known design, the flasher then being in series with the vehicle battery 24. In addition, energization of coil 18 drops the contact arms 25 and 26 associated with the relays 14 and 15 into engagement with the contacts 16 and 17, so as to place the leads 11 and 12 in series with the balance resistors 27 and 28.

Since control of flashing of the warning or stop lights is effected by or in response to energization of coil 18, the description will now be extended to show how such energization is accomplished. It will first be observed that the desired coil energization may be effected by any one of the three parallel circuits, the in-put leads of which are shown at 29, 30 and 31 as being connected with the battery 24.

The in-put lead 29 is in series connection with the battery through the brake light switch shown schematically at 32, and therefore it will be understood that energization of coil 18 may be brought about through braking of the vehicle. Lead 29 is in turn connected with parallel leads 33 and 34, the latter comprising the winding of the solenoid 35 which is therefore responsive to brake light switch actuation to lift arm 36 which is connected to the solenoid plunger 37. Attached to arm 36 are brake shoes 38, 39 which upon lifting arm 36 engage the plates 40 and 41 of the rotor or reference pendulum generally indicated at 42, to stop its free rotation. At the same time, lifting of arm 36 effects electrical contact of the shoes 38 and 39 with the conductive plates 40 and 41, for purposes to be described. Thus the arm 36 and shoes 38 and 39 constitute one form of pendulum holder contemplated by the invention. As shown in Fig. 1, lead 33 is connected with contact 38, and contact 39 is connected with the coil 18 through lead 43.

Referring now to Figs. 2 and 3 the reference pendulum 42 is shown to be mounted on axial rod 44 so as to be swingable about the axis of that rod. Normally, the complete apparatus is mounted so that the axial rod 44 will extend horizontal and normal to the direction of vehicle travel, so that the reference pendulum 42 will rotate in a vertical plane extending in the direction of vehicle travel. Also mounted on the rod 44 is a second or actuator pendulum 45, the two pendulums 42 and 45 being counterbalanced to rotate together. For this purpose the L-shaped electrical contact 46 carried by the pendulum 45 is counterbalanced into engagement with the top of plate 40 at the location 47. When, however, the reference pendulum 42 is held against rotation as during braking of the vehicle causing braking engagement of the contact shoes 38 and 39 with the plates 40 and 41, electrical contact 46 carried by pendulum 45 rotates with that pendulum into engagement with the electrical contact 48 carried by pendulum 42 and in electrical connection with the plate 41. Thus, in general the contacts 46 and 48 will be mounted on the pendulums at rear portions thereof with respect to direction of vehicle travel as indicated by the arrow 49.

Insulator plates are shown at 50 in the spaces between the conductive plates 40 and 41 of pendulum 42, and contact 46 is insulated from pendulum 45.

Extending the description to Fig. 4 which shows the electrical connection carried by the pendulums 42 and 45, it will first be observed that contact 46 is shown as swingable upwardly away from contact 47 and toward contact 48, in response to swinging of pendulum 45 relative to pendulum 42 when the latter is held against rotation. The conductive plates 40 and 41 are shown as terminals in Fig. 4. In addition, Fig. 4 shows a relay 54 including a core 55, a core winding 56 and a relay arm 57 electrically connected with the core 55 and normally out of engagement with contact 58. The latter contact is in direct electrical communication with plate 41 and contact 48.

In operation, when the brake light switch 32 is actuated by the brake pedal, the arm 36 is lifted by the solenoid 35 so as to arrest rotation of the reference pendulum 42 and place lead 33 in electrical communication with plate 40 of pendulum 42. Meanwhile, contact 46 rotates into engagement with contact 48 due to vehicle braking and deceleration. Electrical current then passes through the winding 56 of the holding relay 54 to the contact 46 which is connected to the relay core by lead 59. The current can then pass to plate 41 and through lead 43 to energize coil 18. As a result the vehicle warning lights begin flashing.

It will also be observed that energization of the holding relay winding 56 causes the arm 57 to engage contact 58, establishing an alternate route for current passing through the core 55 of the relay 54. Therefore, when deceleration of the vehicle has stopped but while the brake is still depressed, current can flow from plate 40 to plate 41 through the holding arm 57 of relay 54 to accomplish flashing of the warning light. This is true until contact 46 returns back into normal position engaging contact 47, thereby shorting the coil winding 56 causing arm 57 to open. Relay coil 18 will then be deenergized and flashing will cease.

Referring now to the alternate means for effecting flashing of the warning light through energization of coil 18, it will be observed that during backing up of the vehicle the back-up switch 60 is closed, placing lead 31, seen in Fig. 1, in direct series connection with the battery 24. Current can then flow through the coil 61 of relay 62, thereby attracting the relay arm 63 into engagement with the relay contact 64. The latter is seen to be in series connection with the battery 24 through lead 30 and balance resistor 65. Current can then pass through lead 30, contact 64, arm 63 and lead 66 to contact 67. Arm 36 is not lifted off contact 67 at such times, and therefore contact 67 is in series connection with contact 39 of the arm, enabling current to pass through lead 43 to energize coil 18. Again, when coil 18 is energized the vehicle warning lights 13 are interruptedly flashed as previously described. If during back-up the vehicle brakes are applied, arm 36 is lifted off contact 67 and this causes deenergization of coil 18 and flashing stops.

Referring now in Fig. 1 to the third alternate means for effecting flashing of the warning light, a downwardly spring loaded push button is shown at 70 as being connected with the contact lever 71. Lifting of the push button 70 brings the contact lever 71 into engagement with contact 72 to establish a circuit from the battery through leads 30 and 73 to the arm 71, contact 72 and thence through the arm 63 of relay 62, arm 63 at this time being in engagement with contact 74. As previously described, current then flows through leads 66 and 43 to energize coil 18.

At the same time, current can flow from contact 72 through the coil 75 of relay 76, which then attracts the arm 77 of the relay 76 into engagement with the contact 78 of that relay. Current can then flow from lead 73 to contact 78 through a lead 79, the complete circuit being established through arm 77 and lead 80 joined to lead 43 at junction 81. As a result, when the operator allows the push button 70 to return to normal position breaking the circuit through arm 71, current continues to flow to the coil 18 for energizing the flasher 23, until such time as the operator depresses the push button 70 to swing the lead 79 in the form of an auxiliary lever off the contact 82.

From the foregoing it will be understood that I have provided a novel and useful apparatus for effecting flashing of vehicle warning lights, which apparatus is particularly of advantage in that running of the vehicle downhill will not effect flashing of the warning light, and only deceleration of the vehicle will accomplish this objective, while the vehicle is in forward motion, the amount of such deceleration to effect flashing being uniform irrespective of running of the vehicle on the level or on an incline.

I claim:

1. Apparatus operable to effect flashing of a vehicle stop light in response to vehicle deceleration, comprising first means supported for movement relative to the vehicle for maintaining a substantially constant level relative to the direction of vehicle travel and during tilting of the vehicle from horizontal and in said direction, other means supported for movement relative to said first means in response to deceleration of the vehicle, and an electrical circuit including a switch closable in response to movement of said other means relative to said first means, a flasher unit normally disconnected from said stop light, and a relay having a first position in which the relay is operable to pass continuous electrical current to the vehicle stop light and a second position in which the relay operates to interconnect said flasher unit with said stop light, said relay being energizable from first to second position in response to closing of said switch thereby to effect flashing of said stop light.

2. Apparatus operable to effect flashing of a vehicle stop light in response to vehicle deceleration, comprising first means supported for movement relative to the vehicle for maintaining a substantially constant level relative to the direction of vehicle travel and during tilting of the vehicle from horizontal and in said direction, other means supported for movement relative to said first means in response to deceleration of the vehicle, means for holding said first means against movement relative to the vehicle and operable during braking of the vehicle, and an electrical circuit including a switch closable in response to movement of said other means relative to said first means, a flasher unit normally disconnected from said stop light, and a relay having a first position in which the relay is operable to pass continuous electrical current to the vehicle stop light and a second position in which the relay operates to interconnect said flasher unit with said stop light, said relay being energizable from first to second position in response to closing of said switch thereby to effect flashing of said stop light.

3. Apparatus operable to effect flashing of a vehicle stop light in response to vehicle deceleration, comprising first pendulum means supported for movement relative to the vehicle for maintaining a substantially constant level relative to the direction of vehicle travel and during tilting of the vehicle from horizontal and in said direction, other means supported for movement relative to said first means in response to deceleration of the vehicle, means for holding said first means against movement relative to the vehicle and operable during braking of the vehicle, and an electrical circuit including a switch closable in response to movement of said other means relative to said first means, a flasher unit normally disconnected from said stop light, and a relay having a first position in which the relay is operable to pass continuous electrical current to the vehicle stop light and a second position in which the relay operates to interconnect said flasher unit with said stop light, said relay being energizable from first to second position in response to closing of said switch thereby to effect flashing of said stop light.

4. Apparatus operable to effect flashing of a vehicle stop light in response to vehicle deceleration, comprising first pendulum means supported for movement relative to the vehicle for maintaining a substantially constant level relative to the direction of vehicle travel and during tilting of the vehicle from horizontal and in said direction, other pendulum means supported for movement relative to said first means in response to deceleration of the vehicle, means for holding said first pendulum means against movement relative to the vehicle and operable during braking of the vehicle, and an electrical circuit including a switch closable in response to movement of said other pendulum means relative to said first pendulum means, a flasher unit normally disconnected from said stop light, and a relay having a first position in which the relay is operable to pass continuous electrical current to the vehicle stop light and a second position in which the relay operates to interconnect said flasher unit with said stop light, said relay being energizable from first to second position in response to closing of said switch thereby to effect flashing of said stop light.

5. The invention as defined in claim 4 in which said first and other pendulum means are rotatable about a common axis and are counterbalanced to rotate together about said axis.

6. The invention as defined in claim 5 in which said switch includes contacts carried by said pendulums.

7. The invention as defined in claim 4 in which said means for holding said first pendulum includes a solenoid and a holder movable to engage the first pendulum in response to actuation of the solenoid.

8. The invention as defined in claim 7 in which said circuit includes contacts adapted to be closed in response to engagement of said holder with said first pendulum to effect energization of said relay.

9. The invention as defined in claim 8 in which said circuit includes second relay operable in response to closing of said switch to effect continued energization of said flasher unit after said other pendulum has moved so that said switch is open.

10. The invention as defined in claim 9 in which said second relay is connected in series with said contacts and at the input side of at least one of said contacts, whereby opening of said contacts interrupts energization of said flasher unit.

11. The invention as defined in claim 4 including another circuit means having a switch operable manually to effect independent energization of said flasher unit.

12. The invention as defined in claim 11 including another switch operable upon braking of the vehicle to open said other circuit and thus effect deenergization of said flasher unit.

13. The invention as defined in claim 4 including another circuit means operable in response to backing up of said vehicle to effect independent energization of said flasher unit.

14. The invention as defined in claim 13 including another switch operable upon braking of the vehicle to open said other circuit and thus effect deenergization of said flasher unit.

References Cited in the file of this patent

UNITED STATES PATENTS

| | | |
|---|---|---|
| 2,156,751 | Collins | May 2, 1939 |
| 2,751,575 | Jacobs et al. | June 19, 1956 |

FOREIGN PATENTS

| | | |
|---|---|---|
| 118,017 | Australia | Jan. 11, 1944 |